United States Patent [19]

Konopka

[11] Patent Number: 4,764,857
[45] Date of Patent: Aug. 16, 1988

[54] POWER SUPPLY START-UP CIRCUIT WITH HIGH FREQUENCY TRANSFORMER

[75] Inventor: John G. Konopka, Ingleside, Ill.

[73] Assignee: Zenith Electronics Corporation, Glenview, Ill.

[21] Appl. No.: 47,353

[22] Filed: May 6, 1987

[51] Int. Cl.[4] .............................. H02P 13/18
[52] U.S. Cl. ..................... 363/49; 363/97; 323/901
[58] Field of Search ................ 363/18–21, 363/49, 56, 97, 98; 323/901, 908

[56] References Cited

U.S. PATENT DOCUMENTS 4,063,307 12/1977 Stephens ................ 363/49 X
4,695,936 9/1987 Whittle ................... 363/49 X

FOREIGN PATENT DOCUMENTS 0012031 1/1983 Japan ......................... 363/49

Primary Examiner—Peter S. Wong

[57] ABSTRACT

A start-up circuit for a switch mode power supply comprises a relaxation oscillator including an RC charging circuit for developing a trigger voltage for firing a Sidac connected in series with the primary winding of a small ferrite core transformer. The secondary winding of the transformer is resonated with a tuning capacitor and the voltage coupled to a rectifying circuit for developing a charge across a trigger capacitor. When the trigger capacitor voltage achieves a trigger potential, an SCR is fired for starting a pulse width modulator in the switch mode power supply. The relaxation oscillator is rendered ineffective by a feedback voltage supplied from the power supply when it starts.

6 Claims, 1 Drawing Sheet

U.S. Patent   Aug. 16, 1988   4,764,857
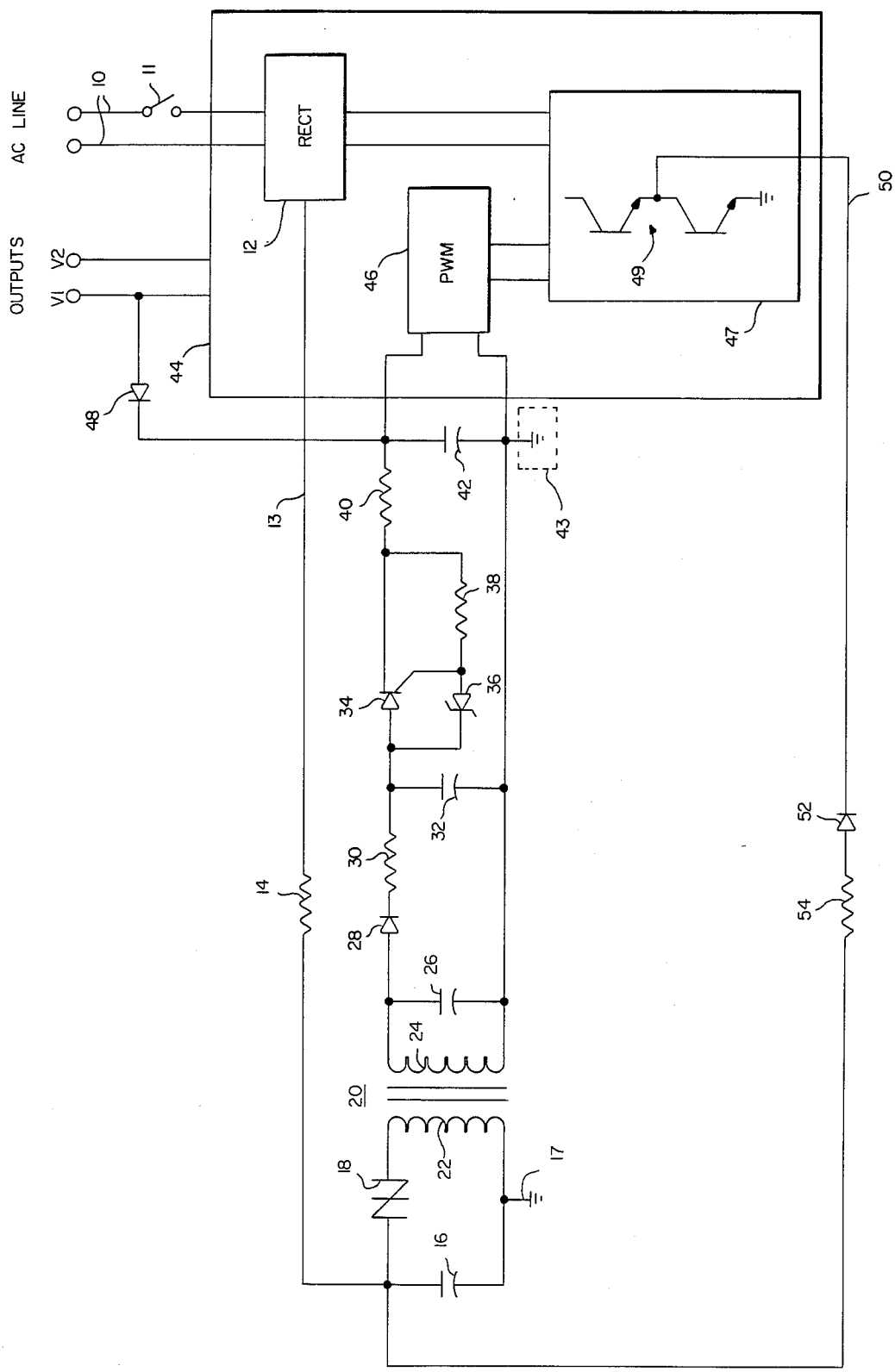

POWER SUPPLY START-UP CIRCUIT WITH HIGH FREQUENCY TRANSFORMER

BACKGROUND OF THE INVENTION AND PRIOR ART

This invention generally relates to power supplies and particularly to a power supply start-up circuit for use in connection with a switch mode power supply (SMPS).

It is common practice in computer installations to utilize SMPS power supplies because of their high efficiency, relatively low cost and light weight. A DC rail is generally established by conventional rectification of the AC voltage present on the main AC power lines. Additionally, the SMPS requires a start-up voltage in order to activate its pulse width modulator (PWM) circuit which controls the transistor switches coupled to the AC line. In prior art supplies, a start-up voltage is provided by a small 60 Hz transformer that delivers approximately 40 milliamperes of current at 15 volts. The transformer is undesirable for a number of reasons.

The transformer is the only device in the power supply that requires a pure sinewave voltage for proper operation. In many situations, it is highly desirable to have a supply that is capable of running from any voltage source, such as a standby power system. The transformer primary winding is often connected across one-half of a voltage doubler circuit to provide its primary winding with 110 volts AC when the power supply is connected to a 220 volts AC line. This can create a voltage imbalance across the main filter capacitors in the supply if the supply is shut down while AC line voltage is present at the supply input. This voltage imbalance can cause the voltage across one of the two capacitors in the voltage doubler circuit to exceed its voltage rating. The 60 Hz transformer also has a bulky iron core and presents packaging and circuit layout problems.

Because switch mode power supplies are not inherently isolated, the transformer is essential to provide isolation from the 60 Hz AC line. With the circuit of the invention, the 60 Hz transformer is replaced with a very small, light weight, ferrite core transformer that retains the necessary isolation. The transformer, which has a low voltage and current requirement, operates for a short period of time in an oscillator mode to develop a charge potential across a capacitor. When the capacitor has reached a sufficient charge potential, a discharge circuit is initiated to supply energy to start the pulse width modulator in the switch mode power supply. Means are also provided for disabling the transformer when the SMPS starts.

OBJECTS OF THE INVENTION

A principal object of the invention is to provide a novel power supply start-up circuit.

Another object of the invention is to provide an SMPS that does not require a 60 Hz start-up transformer.

A further object of the invention is to provide a readily packageable start-up circuit for a SMPS.

BRIEF DESCRIPTION OF THE DRAWING

These and other objects and advantages of the invention will be apparent upon reading the following description in conjunction with the drawing, the single figure of which is a partial schematic diagram of a switch mode power supply constructed in accordance with the invention.

DESCRIPTION OF THE PREFERRED EMBODIMENT

Referring to the drawing, a pair of AC lines 10 is shown connected through a switch 11 to rectifier arrangement 12 in a generally conventional switch mode power supply 44. One output of rectifier arrangement 12 may constitute a DC rail 13 of approximately 300 volts, which may be utilized in the power supply for other reasons in addition to supplying start-up power for SMPS 44. The DC rail voltage is supplied across a resistor 14 and a series connected capacitor 16, that is returned to a primary ground 17. The junction of resistor 14 and capacitor 16 is connected to a Sidac 18, which comprises a voltage sensitive switch that is similar to a silicon-controlled rectifier (SCR), except that it has no gate electrode. When the voltage across Sidac 18 reaches a predetermined level, the Sidac is driven into conduction and remains conductive until the current through it drops below a predetermined level. The Sidac used in the preferred embodiment is a Motorola device identified as MK 1V-135. The Sidac is connected to the primary winding 22 of a high frequency pulse transformer 20 that may have a ferrite core. The secondary winding 24 of transformer 20 is connected in parallel with a tuning capacitor 26. Winding 24 is also connected through a rectifier diode 28 and a resistor 30 to a filter capacitor 32. The voltage developed across filter capacitor 32 is supplied to the junction of the anode of an SCR 34 and the cathode of a zener diode 36. The anode of zener diode 36 is connected to the gate electrode of SCR 34 and is further connected to the cathode of SCR 34 through a resistor 38. The cathode of SCR 34 is connected through a resistor 40 to a capacitor 42 coupled to the PWM 46 in SMPS 44. PWM 46 in turn drives a switching circuit 47, including a pair of switch transistors 49, connected as a half-bridge. In response to PWM 46, SMPS 44 produces DC voltages V1 and V2 of differing magnitudes for supplying appropriate load circuits. One of these voltages V1 is connected through a diode 48 back to the input of the switch mode power supply for providing a boot strap voltage to maintain the PWM 46 operating once SMPS 44 is started. The ground for the secondary portion of the SMPS is isolated from the primary ground 17 as indicated by the dashed line box 43 encompassing the ground symbol. It is the need to maintain this isolation that dictates the use of a transformer in the start-up circuits of both the prior art and the present invention.

As mentioned, SMPS 44 is conventional and its operation is well-known in the art. One difference is that the junction of switch transistors 49 is connected through a diode 52 and a resistor 54 back to the junction of resistor 14 and capacitor 16 at the input of Sidac 18 for cutting off operation of transformer 20 once SMPS 44 starts.

In operation, resistor 14, which is essentially a current limiter, is used in conjunction with capacitor 16 and Sidac 18 and the primary winding 22 of transformer 20 to form a relaxation oscillator. Assuming that the DC rail voltage applied to resistor 14 is about 300 volts DC and that Sidac 18 switches from a blocking state to a conductive state at approximately 125 volts DC, the energy stored in capacitor 16 is discharged through primary winding 22 when the voltage across capacitor 16 reaches 125 volts. When the energy in capacitor 16 is substantially completely transferred through Sidac 18 to transformer 22, the current through Sidac 18 is insufficient to maintain it conductive, and Sidac 18 reverts to its blocking state. This permits capacitor 16 to recharge through resistor 14 from DC rail 13 and the cycle repeats. The time required for one cycle is approximately 4.35 milliseconds (corresponding to a frequency of 230 Hz). The brief pulses of current through primary winding 22 are coupled to secondary winding 24 which, as mentioned, resonates with capacitor 26 (at approximately 2 KHz) to develop a ringing potential. The ringing potential is rectified by rectifier diode 28, current limited by resistor 30 and used to charge filter capacitor 32.

The amount of charge required in capacitor 32 is a function of the amount of energy needed to initiate PWM 46 in SMPS 44. Assuming that 44 milliJoules of energy are required, the energy stored in capacitor 16 when Sidac 18 is changed from its blocking to its conducting state is 781 microJoules. Therefore, fifty-six discharges of capacitor 16 will be needed to charge capacitor 32 to the necessary 44 milliJoules, provided no losses are incurred in the system. In practice, losses run about 50% and the number of discharges of capacitor 16 is therefore doubled to 112. Thus, the total time for energy buildup for starting of SMPS 44 is 0.487 seconds. This time period is sufficiently small so as not to present any operational problems, nor even to be noticeable by a user.

When the voltage across capacitor 32 has reached a trigger potential, that is a level sufficient to cause triggering of SCR 34, SCR 34 fires and transfers the charge in capacitor 32 to PWM 46 in the input circuit of the SMPS 44. The trigger mechanism is zener diode 36 which begins to develop a potential across resistor 38 when the breakdown voltage of zener diode 36 is reached by the charge on capacitor 32. The breakdown voltage for zener diode 36 is 18 volts and when capacitor 32 has a voltage of 19 volts across it, 18 volts appear across zener diode 36 and one volt appears across resistor 38. The one volt is the trigger potential for SCR 34 and results in conduction of SCR 34. The energy in capacitor 32 is thus transferred to PWM 46. The duration of the energy transfer must be sufficiently long for the PWM to start and to enable SMPS 44 boot strap itself via diode 48 from its V1 DC output. The boot strap process generally takes no more than 50 milliseconds.

A desirable feature of the power supply start-up circuit of the invention is that the SMPS is only given a single chance to start. If, due to a malfunction for example, it does not boot strap itself within the time allotted, PWM 46 is prevented from starting to preclude possible damage to the main switching transistors or other components in the circuit. This occurs because the SCR is not reverse biased (as it is by the boot strap voltage when PWM starts normally), and consequently, it stays in conduction. However, it can only provide about 7 volts DC on a continuous basis, which is too low for PWM 44 to function. Thus if SMPS 46 fails to start after its single opportunity to do so, the main on/off switch 11 for the system must be turned off momentarily to execute another start cycle.

Assuming that SMPS 44 does start, it is desired that transformer 20 be disabled since it is no longer required. This is accomplished in the circuit of the invention by diverting charging current for capacitor 16 through resistor 54 and diode 52 to ground through the lower one of half-bridge transistors 49. When the power supply starts, the junction of half-bridge transistors 49 alternately goes to ground potential as the transistors switch. Therefore, the voltage is low on one half of the switching cycle and high on the other half of the cycle. When the voltage is high, diode 52 is reverse biased and there is no effect on the voltage across capacitor 16. When voltage at the junction is at ground, however, charging current for capacitor 16 is diverted to ground through resistor 54 and diode 52. This action keeps the voltage across capacitor 16 well below the predetermined voltage required to change Sidac 18 from its blocking to its conductive state and the circuit ceases to oscillate.

What has been described is a novel start-up circuit for a switch mode power supply that eliminates the 60 Hz start-up transformer. It is recognized that numerous changes in the described embodiment of the invention will be apparent to those skilled in the art without departing from its true spirit and scope. The invention is to be limited only as defined in the claims.

What is claimed is:

1. A start-up circuit for a switch mode power supply including a pulse width modulator having an input and an output comprising:
   a pulse transformer having a primary winding and a secondary winding;
   a source of DC voltage;
   relaxation oscillator means including said source of DC voltage and said primary winding;
   means for charging a capacitor coupled to said secondary winding; and
   trigger means responsive to the charge on said capacitor reaching a predetermined potential for supplying the input of said pulse width modulator with starting current.

2. The circuit of claim 1 wherein said charging means includes rectifying means and an SCR and a zener diode coupled between said capacitor and the input of said pulse width modulator.

3. The circuit of claim 2 further including a feedback circuit for disabling said relaxation oscillator means when said switch mode power supply starts.

4. A start-up circuit for a switch mode power supply including a pulse width modulator and means for providing a DC potential:
   a ferrite core transformer having a primary winding and a secondary winding;
   a relaxation oscillator including a series connected resistor and first capacitor connected across said DC potential and a voltage sensitive device connected between the junction of said resistor and said first capacitor and the primary winding of said ferrite core transformer, said voltage sensitive device conducting and permitting discharge of said first capacitor through said primary winding when the voltage across said first capacitor reaches a predetermined level;
   rectifying means coupled to the secondary winding of said transformer for charging a second capacitor;
   trigger means connected between said second capacitor and said pulse width modulator for supplying starting current to said pulse width modulator when the voltage across said second capacitor reaches a trigger level; and
   feedback means for nullifying the effect of said relaxation oscillator when said switch mode power supply is started.

5. The circuit of claim 4 further including a tuning capacitor coupled across said secondary winding of said ferrite core transformer for developing a ringing potential.

6. The circuit of claim 5 wherein said voltage sensitive device comprises a Sidac.

* * * * *